(12) United States Patent
Larin et al.

(10) Patent No.: US 12,134,048 B2
(45) Date of Patent: Nov. 5, 2024

(54) OIL AND GRIT SEPARATOR SYSTEM WITH TWIN VORTEX

(71) Applicants: Eric Larin, Valleyfield (CA); Bernard Brunet, Valleyfield (CA)

(72) Inventors: Eric Larin, Valleyfield (CA); Bernard Brunet, Valleyfield (CA)

( * ) Notice: Subject to any disclaimer, the term of this patent is extended or adjusted under 35 U.S.C. 154(b) by 52 days.

(21) Appl. No.: 16/901,238

(22) Filed: Jun. 15, 2020

(65) Prior Publication Data
US 2021/0387112 A1    Dec. 16, 2021

(51) Int. Cl.
| | | |
|---|---|---|
| *E03F 5/14* | (2006.01) | |
| *B01D 17/02* | (2006.01) | |
| *B01D 21/26* | (2006.01) | |
| *C02F 1/38* | (2023.01) | |
| *C02F 1/40* | (2023.01) | |
| *E03F 5/04* | (2006.01) | |
| *C02F 101/32* | (2006.01) | |
| *C02F 103/00* | (2006.01) | |

(52) U.S. Cl.
CPC ........ *B01D 21/265* (2013.01); *B01D 17/0211* (2013.01); *B01D 17/0217* (2013.01); *B01D 21/267* (2013.01); *C02F 1/38* (2013.01); *C02F 1/40* (2013.01); *E03F 5/0403* (2013.01); *E03F 5/14* (2013.01); *C02F 2101/32* (2013.01); *C02F 2103/001* (2013.01)

(58) Field of Classification Search
CPC .. E03F 5/0403; E03F 5/14; E03F 5/16; B01D 17/0217; B01D 21/265; B01D 21/267; C02F 1/40

USPC ..... 210/170.03, 519, 532.1, 538, 540, 747.2
See application file for complete search history.

(56) References Cited

U.S. PATENT DOCUMENTS

| | | | |
|---|---|---|---|
| 1,200,951 A * | 10/1916 | Kelly | E03F 5/16 |
| | | | 210/540 |
| 2,754,968 A | 7/1956 | Vegter et al. | |
| 3,204,772 A | 9/1965 | Ruxton | |
| 3,965,013 A | 6/1976 | Jackson | |
| 4,895,582 A | 1/1990 | Bielefeldt | |
| 4,985,148 A | 1/1991 | Monteith | |
| 6,062,767 A * | 5/2000 | Kizhnerman | E03F 5/16 |
| | | | 210/170.03 |
| 6,730,222 B1 | 5/2004 | Andoh et al. | |
| 7,182,874 B2 | 2/2007 | Allard et al. | |
| 7,422,683 B2 | 9/2008 | Park | |
| 7,699,984 B2 * | 4/2010 | Andoh | B01D 21/267 |
| | | | 210/532.1 |
| 8,900,448 B2 | 12/2014 | Fink et al. | |
| 2005/0077248 A1 | 4/2005 | Stark et al. | |
| 2007/0012608 A1 | 1/2007 | Su et al. | |
| 2008/0185325 A1 | 8/2008 | Murray et al. | |
| 2010/0025313 A1 | 2/2010 | Dierkes | |
| 2017/0240438 A1 * | 8/2017 | Babcanec | E03F 5/14 |

(Continued)

*Primary Examiner* — Christopher Upton

(57) ABSTRACT

An oil and grit separator system having twin vortex which uses gravity providing a twin vortex effect to remove sediment and oil from contaminated water. The system is designed to control storm water runoff and reduce the annual suspended solids loading of the granulometric particles. The conception and configuration of the system has a double action vortex. It ensures an optimal treatment level in either light or heavy rain and avoids re-suspension of particles. It also removes, separates and stores floating oil without any possible re-suspension of the matter.

6 Claims, 5 Drawing Sheets

(56) References Cited

U.S. PATENT DOCUMENTS

2019/0210894 A1* 7/2019 Bryant ................. B01D 21/265
2020/0308820 A1* 10/2020 Ellis .......................... E03F 5/14

* cited by examiner

OIL AND GRIT SEPARATOR SYSTEM WITH TWIN VORTEX

CROSS-REFERENCE TO RELATED APPLICATIONS

N/A

BACKGROUND OF THE INVENTION

1. Field of the Invention

The present invention relates generally to the field of hydraulics and stormwater management, and more particularly to an oil and grit separator system with twin vortex.

2. Description of Related Art

As well known in the art, storm water includes rainwater and melted snow/ice that flows over roads, parking lots, lawns, and other sites in agricultural, urban and forest areas. In some areas, polluted runoff from roads, highways and agricultural lands may be the largest source of water pollution. Storm water management practices are implemented to help minimize the impact of polluted runoffs flowing into lakes and streams, and reduce the strain that storm water places on municipal infrastructures, using different types of drainage or filtration systems to treat the urban run-off. However, existing systems of the prior art fail to have the ability to process large amounts of water during peak flow periods, which could result in flooding. Furthermore, some of these systems are limited by technical facts including, among others, space availability, landscape characteristics, and soil properties. Also, most of those systems are expensive and difficult to maintain and clean. U.S. Pat. No. 7,182,874 addresses those issues, but does not extract and store oil from the collected storm water. Consequently, there is a need for improvement in this field.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an objective of this invention to provide for the recovery of oils, suspended solids and other pollutants such as metals (e.g., Pb, Cu, Zn), phosphorus, and nitrogen coupled to particles of sediments from storm water. These actions are made in order to prevent their transport into aquatic environments and municipal facilities. It is another object of this invention to provide for a high performance and affordable storm water treatment technology. It is yet another object of this invention to preserve water resources, including the sources of drinking water, fresh water, and sea water quality.

Further, it is an object of the present invention to provide a system that includes and provides the following features and advantages: a) maximization of oil and sediments removal and storage; b) complete separation and storage of oil and grease; c) designed to control turbulence into the system and prevention of re-suspension of pollutants; d) ease of cleaning and maintenance of the system, without getting into the unit nor dismantling the separation system; e) mounts directly to the water main (inline configuration) as well as in parallel (offline configuration); f) operates in submerging mode; g) has an excellent load factor (treatment) compared to existing treatment systems; h) has no effect on hydraulic head; and, i) designed for tailored sizing of units.

In order to do so, an oil and grit separator system is provided, comprising a large manhole bin having an entry line configured to receive water having oil and sediments and an output line configured to allow water free of oil and sediments to exit the system; a flow divider plate configured to direct the water into at least one centrifuge plate, wherein the at least one centrifuge plate is configured to direct the water into at least one funnel configured to induce the contaminated water to vortex to separate the sediments from the water a sediment vault configured to hold the water and separated sediments; and, an oil storage area positioned in the sediment vault, wherein the oil storage area is confined by an angular plate having a retaining flap downwardly extending from angular plate providing a trap for the oil and an exit for the water, wherein the exit is in communication with the output line.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

Figures 1A, 1B:
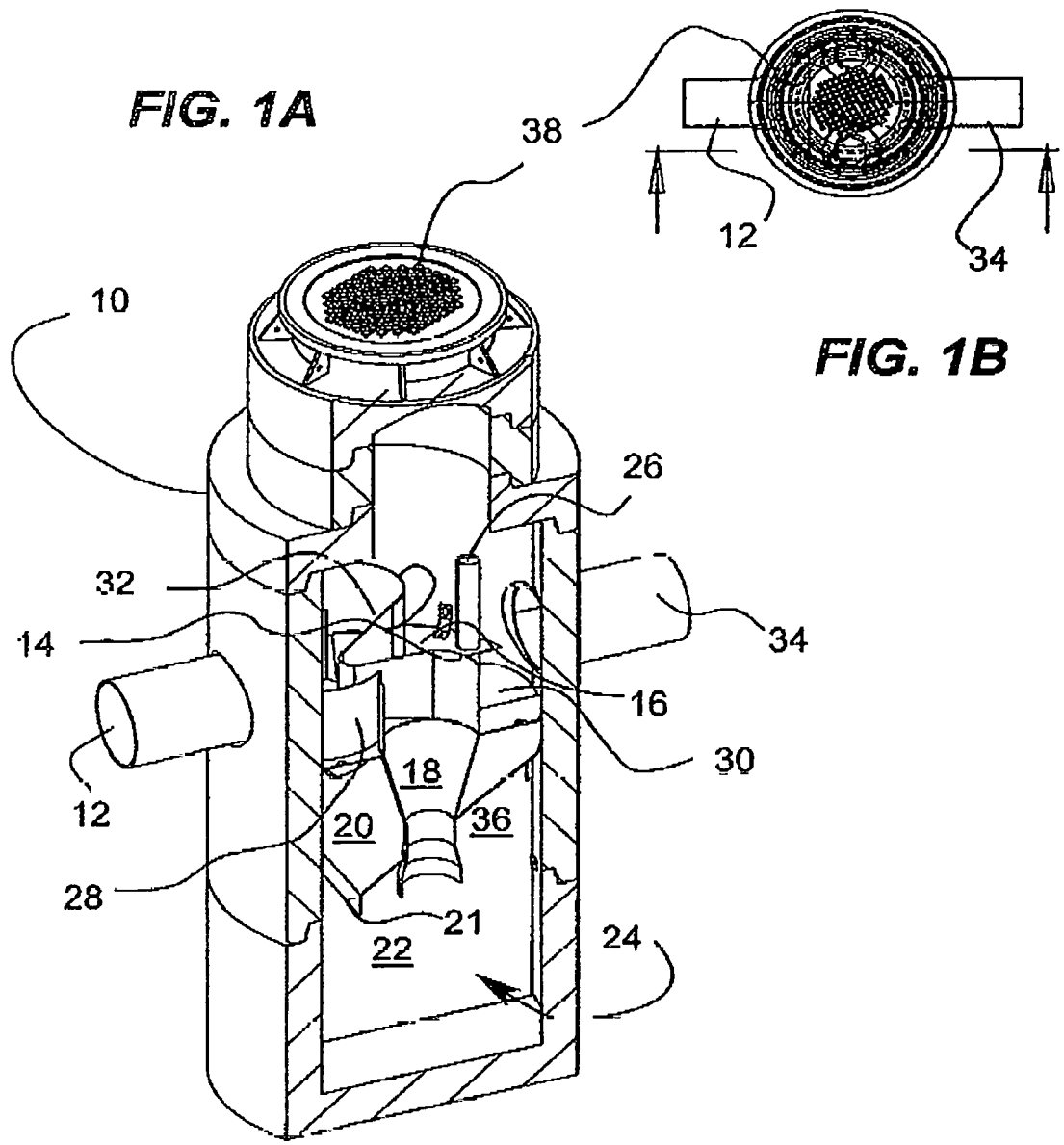
FIG. 1A is an isometric cutaway view of the system according to an embodiment of the present invention.
FIG. 1B is a top view of the system according to an embodiment of the present invention.
Figure 2A:
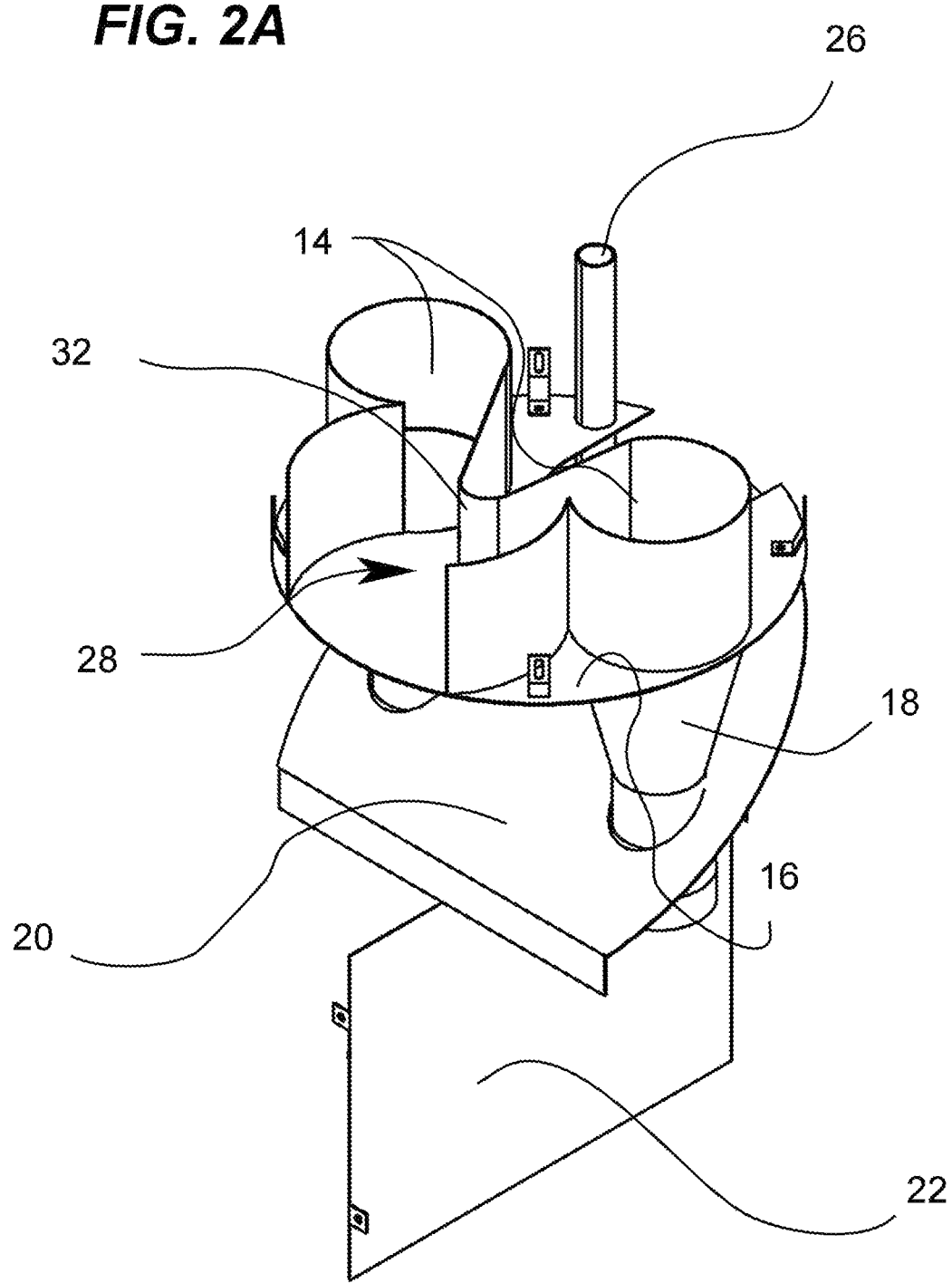
FIGS. 2A-B are isometric views from different angles showing the interior components of the system according to an embodiment of the present invention.
Figure 2B:
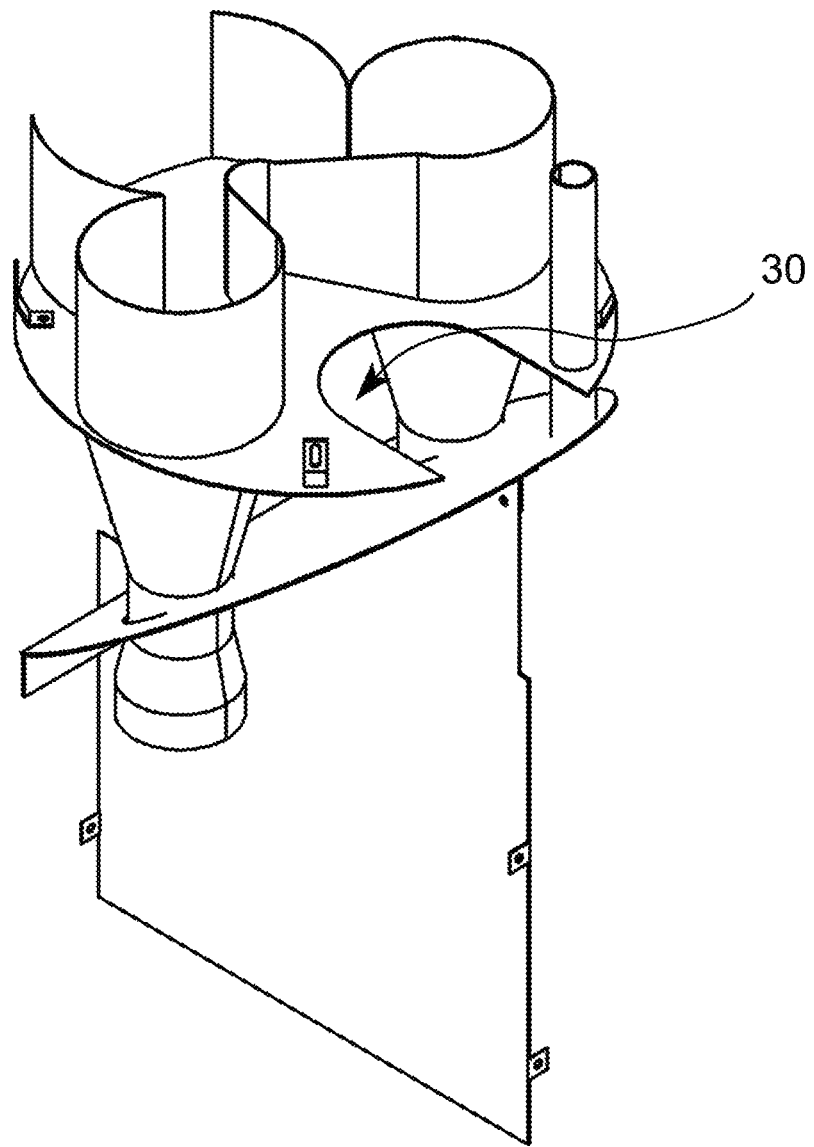
Figure 3A:
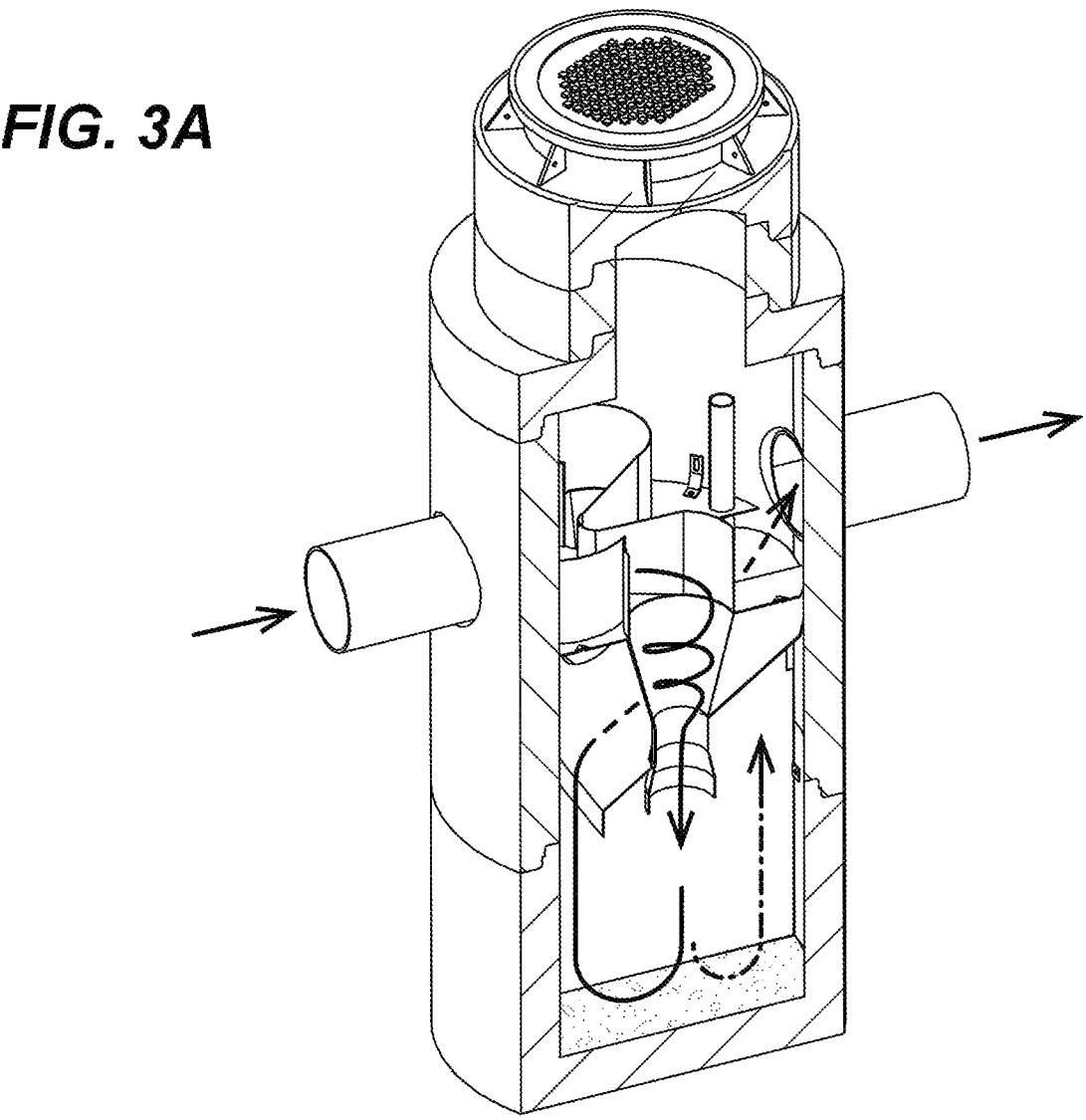
FIG. 3A is an isometric cutaway view of the invention showing a functional diagram for the paths for storm water, sediments, coil, and clean water through the system according to an embodiment of the present invention.
Figure 3B:
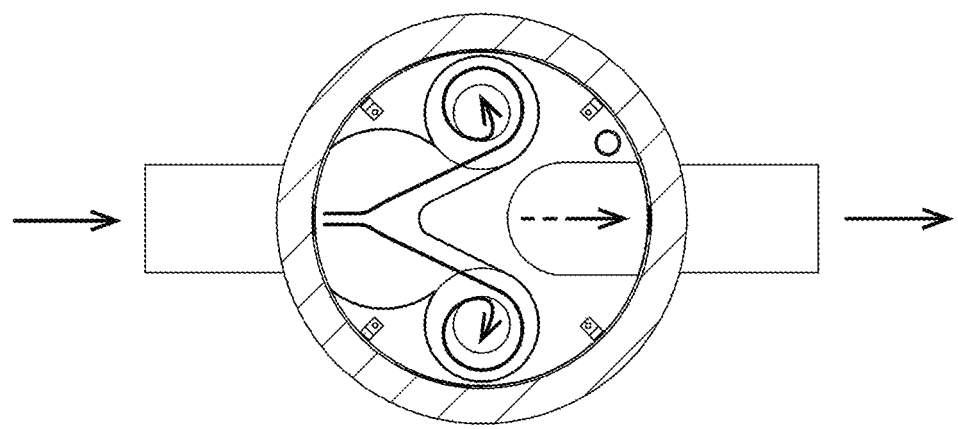
FIG. 3B is a top view of FIG. 3A.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an oil and grit separator system with twin vortex.

Referring now to FIGS. 1A-2B, the oil and grit separator system with twin vortex is constructed inside a large manhole bin 10 having an entry line 12 for contaminated water, a centrifuge plate 14, a horizontal plate 16, a pair of hourglass shaped funnels 18, an angular plate 20 from which downwardly extends a retaining flap 21, a vortex separator plate 22, a sediment vault 24, a cleanout port 26, an entry point 28 defined by side panels 29, an exit hatch 30, a calibrated flow divider plate 32, an output line 34 for treated water, and an oil storage area 36. In one embodiment, the horizontal plate 16 is circular and is configured to provide support for the other elements. Further, the horizontal plate may be used as a floor surface for maintenance workers to stand on.

Now referring to FIGS. 1A-3B, during use, storm water enters into the manhole bin 10 via the entry line 12 and into the entry point 28. Then, the storm water hits the calibrated flow divider plate 32 which directs the storm water flow into the two centrifuge plates 14. The storm water then flows down into the pair of funnels 18, which induce rotation as the storm water goes down and speeds up as the funnels 18 shape narrows, thus increasing the vortex effect. Advantageously, since the funnels 18 expand in their lower section, this contributes to the separation of the solids (sediments) from the storm water by way of the centrifuge effect wherein the heavier sediments move to the periphery of the vortex. As the water and sediments exit the funnels 18, they fall down into the sediment vault 24 through the normal process of decantation and sedimentation.

As water level rises, the collect sediment remains in the sediment vault 24 while the relatively cleaner water level rises until it eventually reaches flap 21 which makes a separation to create the oil storage area 36. Since oil rises on top of the water, most of the oil flows into and is kept in the oil storage area 36. In fact, as long as water level is above the bottom part of the flap 21, all of the oil is sequestered in the oil storage area 36. As the water level keeps rising, it reaches the horizontal plate 16, where any residual oil clings to the plate, allowing the oil free water to escape from the exit hatch 30 and go out the output line 34.

In one embodiment, the vortex separator plate 22, located in the sediment vault 24, separates the funnels 18 from one another to prevent turbulence, allowing for a better vortex effect and to optimize the removal of contaminants and sediments. In one embodiment, the cleanout port 26 allows for the use of a dipstick (not shown) to check the level of oil in the oil storage area 36.

The construction of the manhole bin 10 is generally made using current practices that comply with manhole manufacturing standards and uses methods known in the art. In one embodiment, the system is secured inside the manhole bin 10 by way of brackets 40. Except for the concrete manhole bin 10, the other components of the invention are preferably made out of aluminum chosen for its excellent mechanical properties and resistance to vibration fatigue and corrosion, even in salt water. However, other materials may be used, including but not limited to composites, fiberglass, polyvinyl chloride (PVC) and high-density polyethylene (HDPE).

Figure 4A:
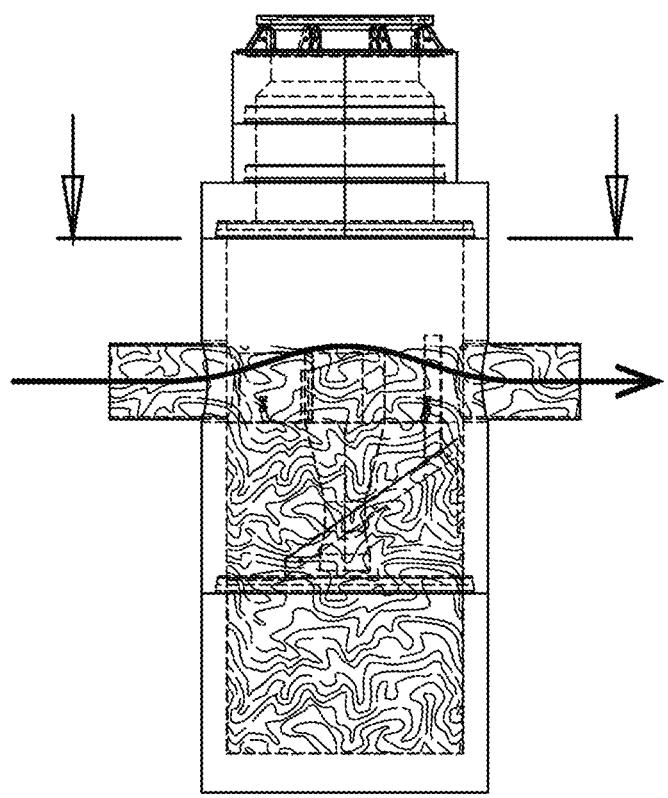
FIG. 4A is a side cutaway view showing a functional diagram of the paths for storm water by-pass when an overload occurs according to an embodiment of the present invention.
Figure 4B:
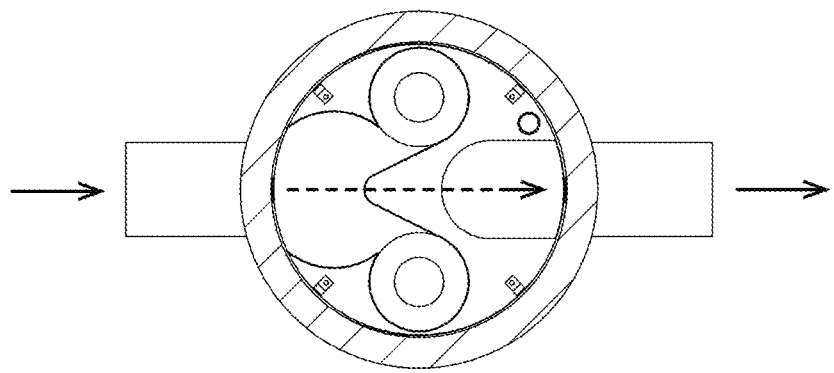
FIG. 4B is a top view of FIG. 3B.

As seen in FIGS. 4A-B, in the case of exceptional levels of storm water, the excess water can go over the calibrated flow divider plate 32 as well as the centrifuge plate 14 and flow straight out the exit line output line 34. It should be understood, that this extreme scenario represents only about 10% of rain events.

The inspection process does not require to physically enter the unit nor to dismantle the separation system, rather it is carried out from the ground level by simply removing a manhole cover 38 and introducing the dip stick into the cleanout port 26 to measure oil levels, or a samples stick into the funnels 18 to sample sediment levels. The cleanout port 26 allows for the pumping out the oil, while the funnels 18 allow for the removal of the sediments. This facilitates and reduces the costs of final sediment and oil cleaning and disposal.

The maintenance requirements are then determined by comparing the sediments measured depth with the maximum depth in the sediment vault 24. Also, in order to ensure the sustainable performance of the system, it must be cleaned when sediments have accumulated to the maximum depth in the sediment vault 24. The ease of cleaning of this system is a priority in its design. In fact, important research in the nature of the captured sediments offers a product that is easy to maintain. Thus, the cleaning process of the system is safe and simple, is carried out from the ground level and does not require to physically enter the unit nor to dismantle the separation system. Removing pollutants, sediments, oils, and other debris, is done using a vacuum truck, which is easily done by removing the manhole cover 38 and inserting the cleaning hose into each vortex to retrieve sediments or into the cleanout port 26 to retrieve the oil. And finally, the system is designed for a tailored sizing of the units.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An oil and grit separator system comprising:
   a manhole bin having an entry line configured to receive water having oil and sediments and an output line configured to allow water free of oil and sediments to exit the system;

a flow divider plate configured to direct the water into at least one centrifuge plate, wherein the at least one centrifuge plate is configured to direct the water into at least one funnel configured to induce the contaminated water to vortex to separate the sediments from the water;

a sediment vault configured to hold the water and separated sediments; and, an oil storage area positioned in the sediment vault, wherein the oil storage area is confined by an angular plate having a retaining flap downwardly extending from angular plate providing a trap for the oil and an exit for the water, wherein the exit is in communication with the output line.

2. The system of claim 1, further comprising a horizontal plate used for maintenance workers to stand on.

3. The system of claim 2, wherein the horizontal plate is positioned approximate the output line such that any residual oil in the water clings to it prior to the water passing through the output line.

4. The system of claim 1, wherein the at least one centrifuge plate is two centrifuge plates and the at least one funnel is two funnels.

5. The system of claim 4, further comprising a separator plate positioned in the sediment vault configured to separate the two funnels from one another preventing turbulence allowing for a better vortex effect to optimize the separation of sediment from the water.

6. The system of claim 1, further comprising a cleanout port located at the upper part of the system and connected to the oil storage area and allowing for the use of a dipstick to check the level of oil in the oil storage area.

\* \* \* \* \*